(12) United States Patent
Liu et al.

(10) Patent No.: US 10,831,495 B2
(45) Date of Patent: *Nov. 10, 2020

(54) PARALLELIZATION OF NUMERIC OPTIMIZERS

(71) Applicant: International Business Machines Corporation, Armonk, NY (US)

(72) Inventors: Peng Liu, Yorktown Heights, NY (US); Richard Chen, Mount Kisco, NY (US); Shaohan Hu, Yorktown Heights, NY (US); Marco Pistoia, Amawalk, NY (US); John A. Gunnels, Somers, NY (US); Antonio Mezzacapo, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,264

(22) Filed: Apr. 7, 2020

(65) Prior Publication Data

US 2020/0233671 A1    Jul. 23, 2020

Related U.S. Application Data

(63) Continuation of application No. 16/173,356, filed on Oct. 29, 2018.

(51) Int. Cl.
*G06F 9/38* (2018.01)
*G06F 9/50* (2006.01)
(Continued)

(52) U.S. Cl.
CPC .......... *G06F 9/3822* (2013.01); *G06F 9/3881* (2013.01); *G06F 9/5038* (2013.01); *G06F 9/542* (2013.01); *G06F 16/903* (2019.01)

(58) Field of Classification Search
USPC ........................................................ 708/100
See application file for complete search history.

(56) References Cited

U.S. PATENT DOCUMENTS

| | | | |
|---|---|---|---|
| 2016/0306844 A1* | 10/2016 | Frank | G06N 7/005 |
| 2018/0336493 A1* | 11/2018 | Hayes | G06F 9/54 |

OTHER PUBLICATIONS

List of all IBM related dockets, 2020.

* cited by examiner

*Primary Examiner* — Tan V Mai
(74) *Attorney, Agent, or Firm* — Garg Law Firm, PLLC; Rakesh Garg; Keivan Razavi

(57) ABSTRACT

A method for parallelization of a numeric optimizer includes detecting an initialization of a numeric optimization process of a given function. The method computes a vector-distance between an input vector and a first neighbor vector of a set of neighbor vectors. The method predicts, using the computed vector-distance, a subset of the set of neighbor vectors. The method pre-computes, in a parallel processing system, a set of evaluation values in parallel, each evaluation value corresponding to one of the subset of the set of neighbor vectors. The method detects a computation request from the numeric optimization process, the computation request involving at least one of the set of evaluation values. The method supplies, in response to receiving the computation request, and without performing a computation of the computation request, a parallelly pre-computed evaluation value from the set of evaluation values to the numeric optimization process.

20 Claims, 4 Drawing Sheets

(51) Int. Cl.
*G06F 16/903* (2019.01)
*G06F 9/54* (2006.01)

PARALLELIZATION OF NUMERIC OPTIMIZERS

TECHNICAL FIELD

The present invention relates generally to numeric optimization. More particularly, the present invention relates to a method for parallelization of numeric optimizers.

BACKGROUND

Serial computation involves the implementation of a series of instructions in a specified order on a computer. One instruction executes at a time. Once the instruction is finished, a subsequent instruction is executed. The length of time required to execute the series of instructions depends on factors such as the number of instructions and complexity of the instructions.

Parallel computation performs multiple calculations or the execution of processes simultaneously. The instructions are separated into subsets, with a corresponding processing unit executing a subset of the instructions. Parallel computation decreases the length of time needed to execute the same set of instructions using serial computation. Parallel computation requires at least two processing units in order to separate and simultaneously execute each subset of the instructions. For example, a multi-core processor is a single processor with at least two processing units, called cores, which read and execute program instructions. Each core is independent and can access a shared memory concurrently. A multi-core processor executes multiple instructions on separate cores at the same time.

Numerical optimization determines the selection of a best element (based on a criterion or set of criteria) from a set of viable alternatives. Specifically, given a function with n parameters, numerical optimization generally involves determining minimum or maximum function values and the corresponding parameter values. In many instances, numerical optimizers compute partial derivatives of the given function to determine how the function values change with respect to the parameters. For example, numerical optimizers can approximate partial derivatives by computing a slope between an input point and a neighboring point.

The illustrative embodiments recognize that numeric optimizers generally perform computations sequentially. The illustrative embodiments recognize that modification of numeric optimizers to perform parallel evaluations presents numerous technical challenges. For example, modification requires understanding of complex optimization logic. The illustrative embodiments further recognize that modification of one numeric optimizer does not generally apply to other numeric optimizers.

A blackbox function is a function which itself and/or a derivative of the function cannot be expressed in analytic form using well-known mathematical operations. The illustrative embodiments recognize that numeric optimizers approximate partial derivatives of blackbox functions to determine minimum or maximum blackbox function values. For example, given a function $f(\vec{x})$ with an input vector $\vec{x}$ having i=1 . . . n parameters, the partial derivative with respect to the ith parameter of a neighbor value $\vec{x}+\alpha\vec{\mu}_i$ can be computed as $$\frac{\partial f}{\partial x_i} \approx \frac{f(\vec{x}+\alpha\vec{u}_i)-f(\vec{x})}{\alpha},$$

where $\alpha$ is a scalar quantity and $\vec{\mu}_i$ is a unit vector in a direction of the ith parameter. The illustrative embodiments recognize that numeric optimizers compute $f(\vec{x})$ and $f(\vec{x}+\alpha\vec{\mu}_i)$ for i=1 . . . n to calculate the approximation of the partial derivative. The illustrative embodiments recognize that the input vector and neighboring values differ only by the amount $\alpha$ at the ith parameter. The illustrative embodiments further recognize that presently available numeric optimizers sequentially compute function values and partial derivatives at a single parameter before moving to the next parameter.

With the advent of quantum processors, large problems such as the problems modeled after the NP-hard traveling salesman problem, which were not practically solvable or verifiable using conventional processors, have become viably computable. To leverage quantum computing in solving such problems, the problem has to be capable of breaking down for parallel computation using quantum processors.

Numeric optimizers are also in the class of such problems that can quickly become unreasonably large for precise or conclusive computation using conventional processors. In order to leverage quantum computing to execute numeric optimizers, numeric optimizers have to be reconfigured for parallelization. The illustrative embodiments recognize that because of their sequential implementation, known numeric optimizers are particularly challenging for parallelization.

SUMMARY

The illustrative embodiments provide a method, system, and computer program product for parallelization of numeric optimizers. A method for parallelization of a numeric optimizer includes detecting an initialization of a numeric optimization process of a given function.

In an embodiment, the method computes a vector-distance between an input vector and a first neighbor vector of a set of neighbor vectors. In an embodiment, the method predicts, using the computed vector-distance, a subset of the set of neighbor vectors.

In an embodiment, the method pre-computes, in a parallel processing system, a set of evaluation values in parallel, each evaluation value corresponding to one of the subset of the set of neighbor vectors. In an embodiment, the method detects a computation request from the numeric optimization process, the computation request involving at least one of the set of evaluation values. In an embodiment, the parallel processing system is a multi-core processor.

In an embodiment, the method supplies, in response to receiving the computation request, and without performing a computation of the computation request, a parallelly pre-computed evaluation value from the set of evaluation values to the numeric optimization process. In an embodiment, detecting the initialization of the numeric optimization process includes sensing a trigger through an application programming interface. In an embodiment, pre-computing the set of evaluation values includes pre-computing the set of evaluation values in a parallel processing system.

In an embodiment, the method stores the set of evaluation values and the corresponding subset of the set of neighbor vectors in a database.

In an embodiment, the method detects an initialization of a second computation of the numeric optimization process. In an embodiment, the method removes, in response to detecting the initialization of the second computation, the stored set of evaluation values and the corresponding subset of the set of neighbor vectors from the database.

In an embodiment, pre-computing the set of evaluation values includes inputting the set of neighbor vectors into the given function to generate the set of evaluation values.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
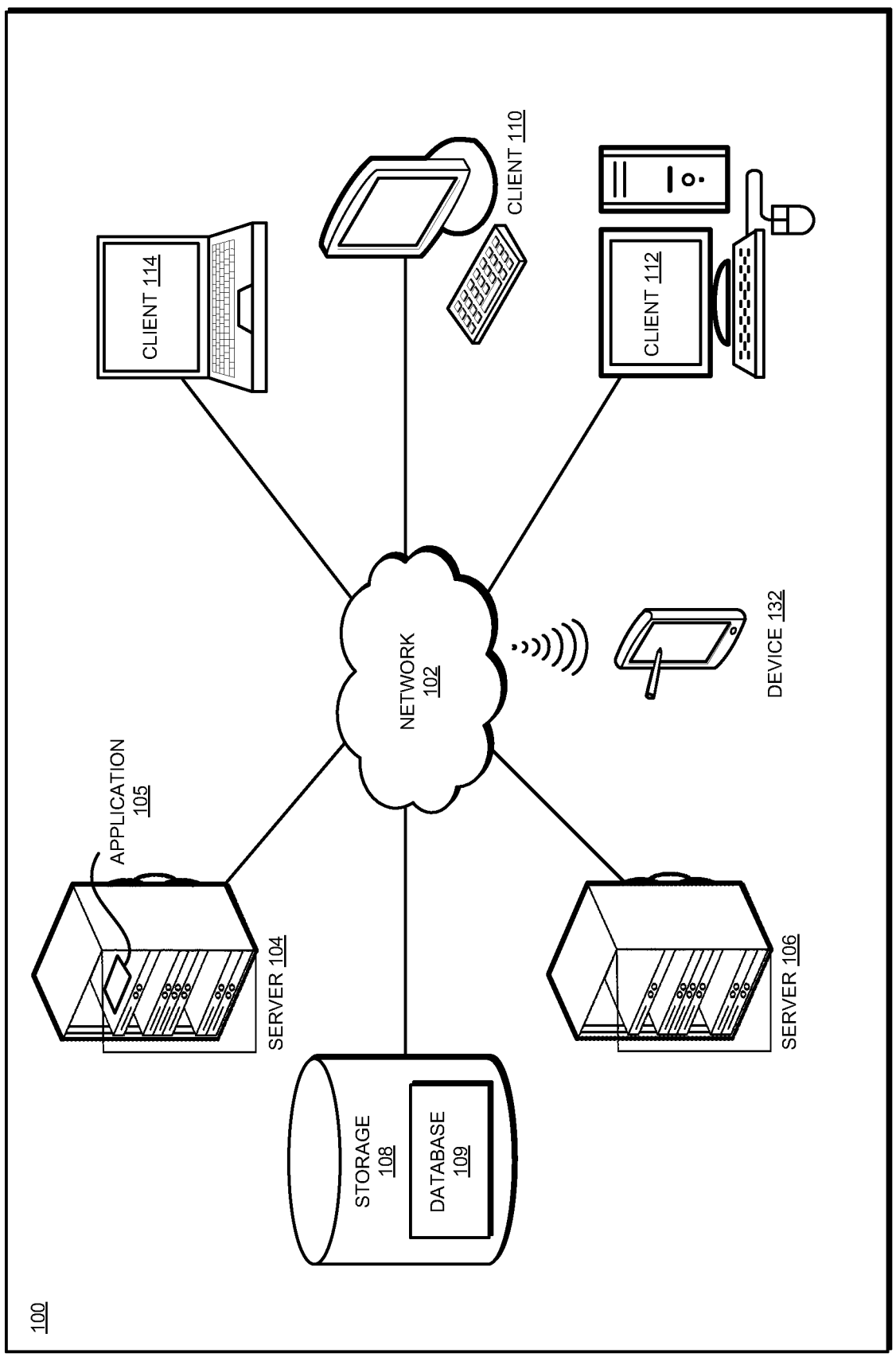
FIG. 1 depicts a block diagram of a network of data processing systems in which illustrative embodiments may be implemented.

The illustrative embodiments used to describe the invention generally address and solve the above-described problems of parallelizing numeric optimization algorithms. The illustrative embodiments provide a method for parallelization of numeric optimization.

An embodiment provides a method for bootstrapping a variational algorithm for quantum computing. Another embodiment provides a computer usable program product comprising a computer-readable storage device, and program instructions stored on the storage device, the stored program instructions comprising a method for bootstrapping a variational algorithm for quantum computing. The instructions are executable using a quantum processor. Another embodiment provides a quantum computer system comprising a quantum processor, a computer-readable memory, and a computer-readable storage device, and program instructions stored on the storage device for execution by the quantum processor via the memory, the stored program instructions comprising a method for bootstrapping a variational algorithm for quantum computing.

The various embodiments execute in an application in a device. An embodiment detects initialization of a computation. For example, the embodiment can detect initialization of a computation of a numeric optimization process of a given function. The embodiment computes a difference (vector-distance) between an input vector and a first neighbor vector of a subset of neighbor vectors. As another example, the input vector and each neighbor vector comprises n parameter values. For example, the embodiment computes a difference (vector-distance) by subtracting the input vector from the first neighbor vector. As another example, the embodiment computes the difference by computing a magnitude of the difference between the input vector and the first neighbor vector. As another example, the embodiment computes a vector-distance by determining the input vector and the first neighbor vector differ at only a single parameter value.

The embodiment predicts a subset of the set of neighbor vectors. For example, the embodiment predicts the subset of the set of neighbor vectors by adding the computed difference (vector-distance) to the input vector at a single parameter value for each neighbor vector of the subset of neighbor vectors. As another example, each neighbor vector differs from any other neighbor vector at two parameter values. The embodiment stores the set of neighbor vectors in a database.

The embodiment pre-computes, in a parallel processing system, a set of function values for the subset of neighbor vectors. For example, the embodiment pre-computes the set of function values by evaluating the function for each neighbor vector of the subset of neighbor vectors to determine a corresponding function value. As another example, the embodiment pre-computes the set of function values by evaluating the function for each neighbor vector in parallel. The embodiment stores the set of function values with the corresponding neighbor vector in the database.

The embodiment supplies, in response to a request, the set of function values. For example, the embodiment supplies the set of function values in response to a numeric optimizer.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for bootstrapping a variational algorithm for quantum computing using a variety of components that can be purposed or repurposed to provide a described function within a data processing environment, and such adaptations are contemplated within the scope of the illustrative embodiments.

The illustrative embodiments are described with respect to certain types of steps, applications, quantum logic gates, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
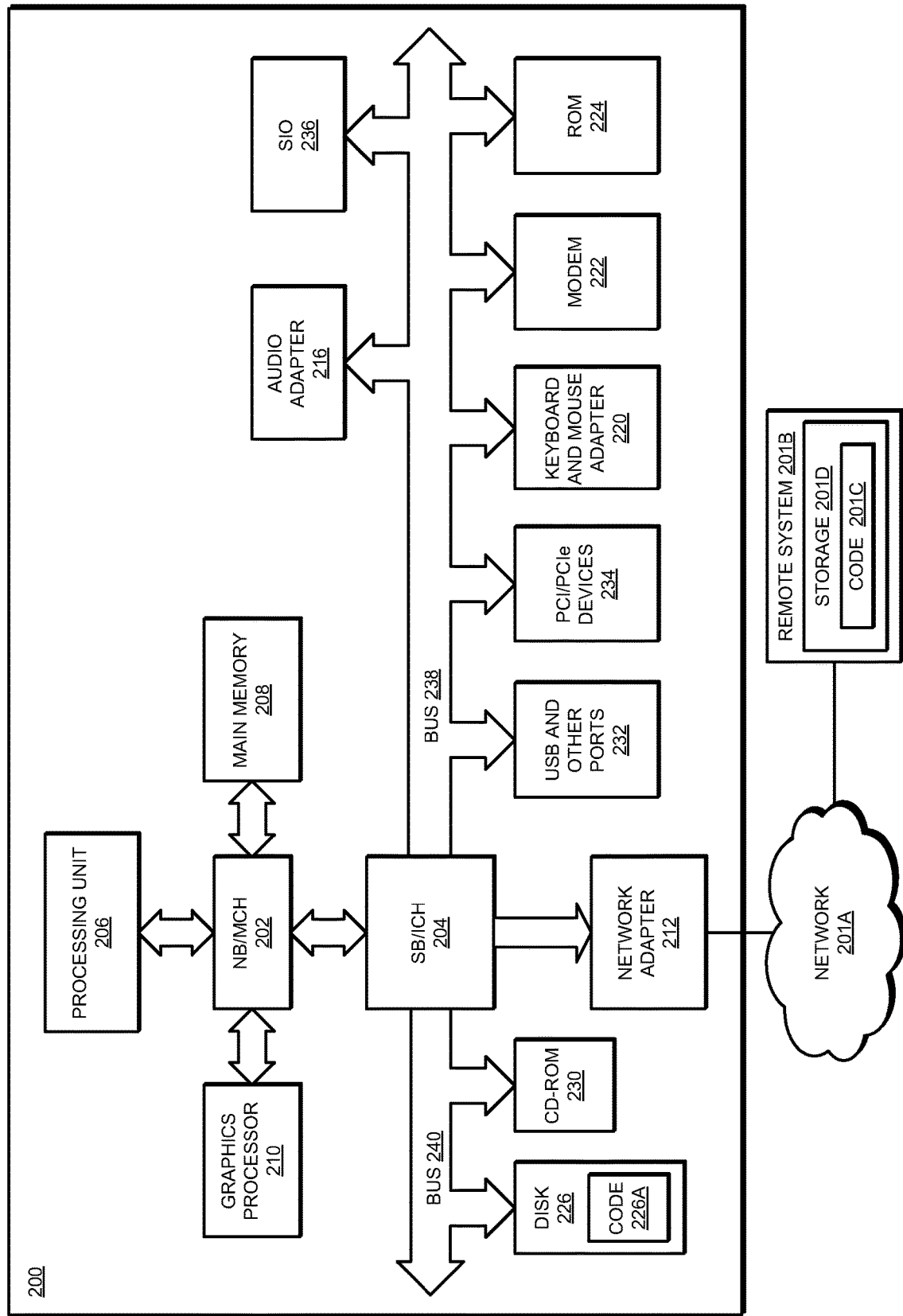
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon. Any software application described as executing in any data processing system in FIG. 1 can be configured to execute in another data processing system in a similar manner. Any data or information stored or produced in any data processing system in FIG. 1 can be configured to be stored or produced in another data processing system in a similar manner.

Clients 110, 112, and 114 are also coupled to network 102. A data processing system, such as server 104 or server 106, or client 110, 112, or 114 may contain data and may have software applications or software tools executing computing processes thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a computing device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 pre-computes a set of neighbor values and populates database 109 with pre-computed neighbor values, in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, servers 104 and 106 may provide data, such as boot files, operating system images, and applications to clients 110, 112, and 114. Clients 110, 112, and 114 may be clients to servers 104 and 106 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
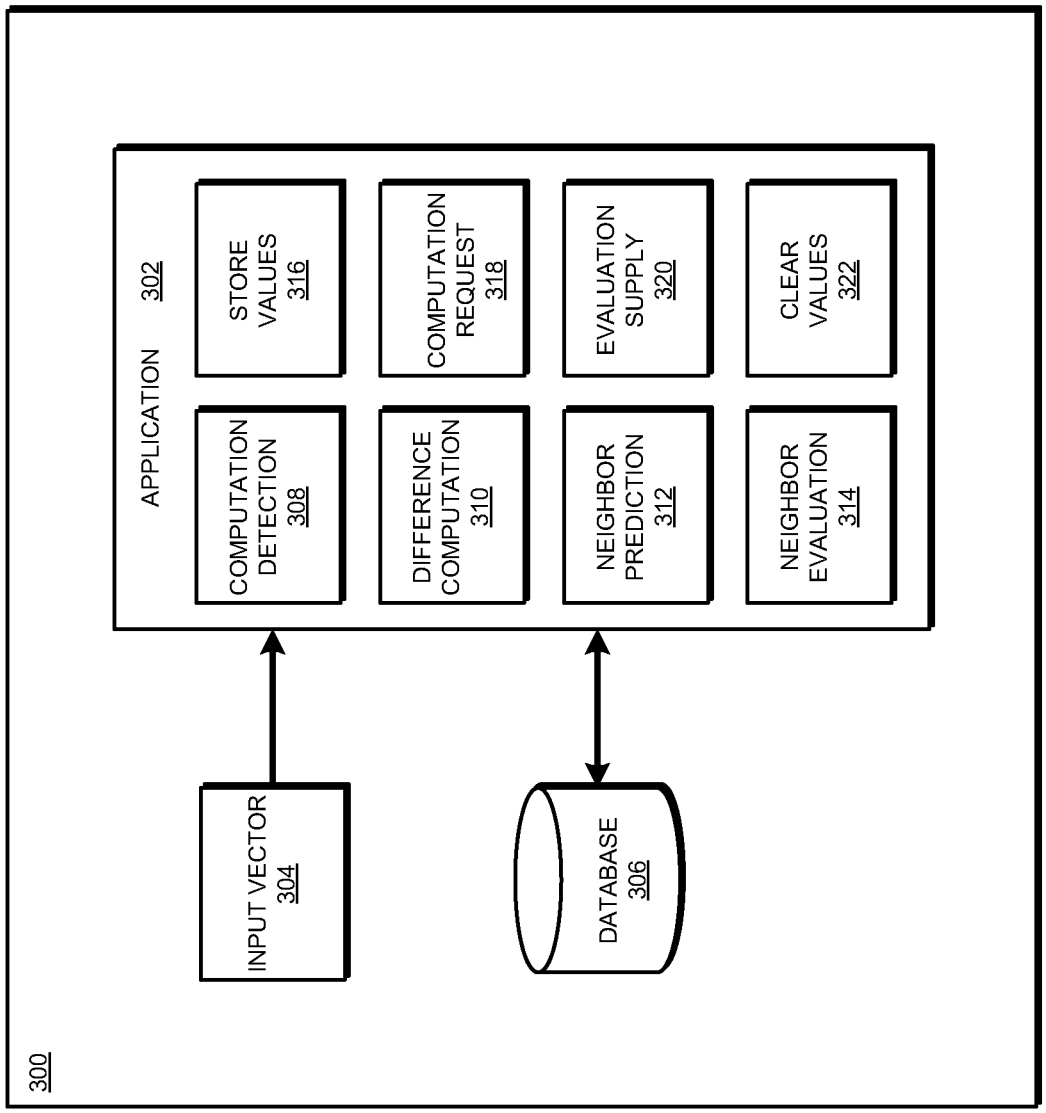
FIG. 3 depicts a block diagram of an example configuration for parallelization of numeric optimizers in accordance with an illustrative embodiment.

With reference to FIG. 3, this figure depicts a block diagram of an example configuration 300 for parallelization of numeric optimizers. The example embodiment includes an application 302. In a particular embodiment, application 302 is an example of application 105 of FIG. 1.

Application 302 receives an input vector 304 which represents an initial input of a function to be optimized. The input vector includes a set of parameter values.

Application 302 includes a computation detection component 308, a difference computation component 310, a neighbor prediction component 312, a neighbor evaluation component 314, a storage component 316, a computation request component 318, an evaluation supply component 320, and a clear values component 322. In an embodiment, component 308 detects the initialization of a computation. For example, component 308 can sense a trigger through an application programming interface (API). In an embodiment, component 308 senses a trigger associated with a numeric optimization process. In an embodiment, component 308 detects the initialization of a numeric optimizer computation seeking to optimize a function with an associated input vector. For example, component 308 can detect computation of a first neighbor vector of a set of neighbor vectors for the input vector. The first neighbor vector includes the same number of parameter values as the input vector. In an embodiment, component 310 computes a difference (vector-distance) between the input vector 304 and the first neighbor vector of the subset of neighbor vectors.

In an embodiment, neighbor prediction component 312 computes a subset of the set of neighbor vectors based on the computed difference and the input vector 304. For example, component 312 can add the difference to one of the set of parameter values of the input vector to compute a first vector of the subset. Each neighbor vector differs from the input vector at only one of the parameter values of the corresponding neighbor vector.

In an embodiment, component 312 computes one neighbor vector for each remaining parameter value of the input vector. For example, if the input vector 304 includes eight parameter values, component 312 can compute seven additional neighbor vectors by adding the difference from the first neighbor vector and the input vector to one of the parameter values of the input vector to compute one of the subset of neighbor vectors. In an embodiment, component 312 computes the subset of the set of neighbor vectors in parallel in a parallel processing system. In an embodiment, the parallel processing system is a multi-core processor. In an embodiment, the number of cores of the multi-core processor is equal to the number of parameters in the input vector.

In an embodiment, component 312 determines a pattern of the numeric optimization process. For example, component 312 can determine each pass (iteration) of the numeric optimization process on an input vector follows the same pattern. In an embodiment, component 312 uses a determined pattern to predict a subset of the set of neighbor vectors for a subsequent pass of the numeric optimization process. For example, component 312 can determine each pass uses a constant difference value between the input vector and the set of neighbor vectors. In subsequent passes of the numeric optimization process, application 302 does not recompute the difference value.

In an embodiment, neighbor evaluation component 314 pre-computes a set of function values for the set of neighbor vectors, including the first neighbor vector and the subset of the set of neighbor vectors. In an embodiment, component 314 pre-computes the set of function values by inputting each of the neighbor vectors into the function to be optimized and generating a corresponding function value for each neighbor vector. In an embodiment, component 314 pre-computes the set of function values in a parallel processing system.

In an embodiment, storage component 316 records each pre-computed function value and associated neighbor vector in database 306. In an embodiment, computation request component 318 detects a request by the numeric optimizer for at least one of the set of neighbor vectors and/or at least one of the function values. For example, component 318 can detect that the numeric optimizer is attempting to compute a neighbor vector for the input vector. In another example, component 318 can detect that the numeric optimizer is attempting to compute a function value for a neighbor vector. In an embodiment, component 318 supplies at least one of the set of neighbor vectors and/or at least one of the set of function values (evaluation values) before the numeric optimizer performs a step (computation) of the computation request. In an embodiment, component 318 supplies at least one of the set of pre-computed function values without performing a computation of the computation request.

In an embodiment, evaluation supply component 320 provides pre-computed function values and neighbor vectors to the numeric optimizer in response to a detection by component 318. For example, component 320 can supply the pre-computed set of function values for the set of neighbor vectors to the numeric optimizer. In an embodiment, clear component 322 deletes the stored set of neighbor vectors and stored set of evaluation values from the database 306 in response to detection of a new input vector. In an embodiment, component 322 determines the numeric optimization process is moving away from an input vector. For example, component 322 can determine a vector recorded in a storage database, such as database 306, is between at least two other vectors in the storage database. If the vector is between two other vectors, component 322 retains the vector in the database. If the vector does not fall between two other vectors, component 322 removes the vector from the database.

Figure 4:
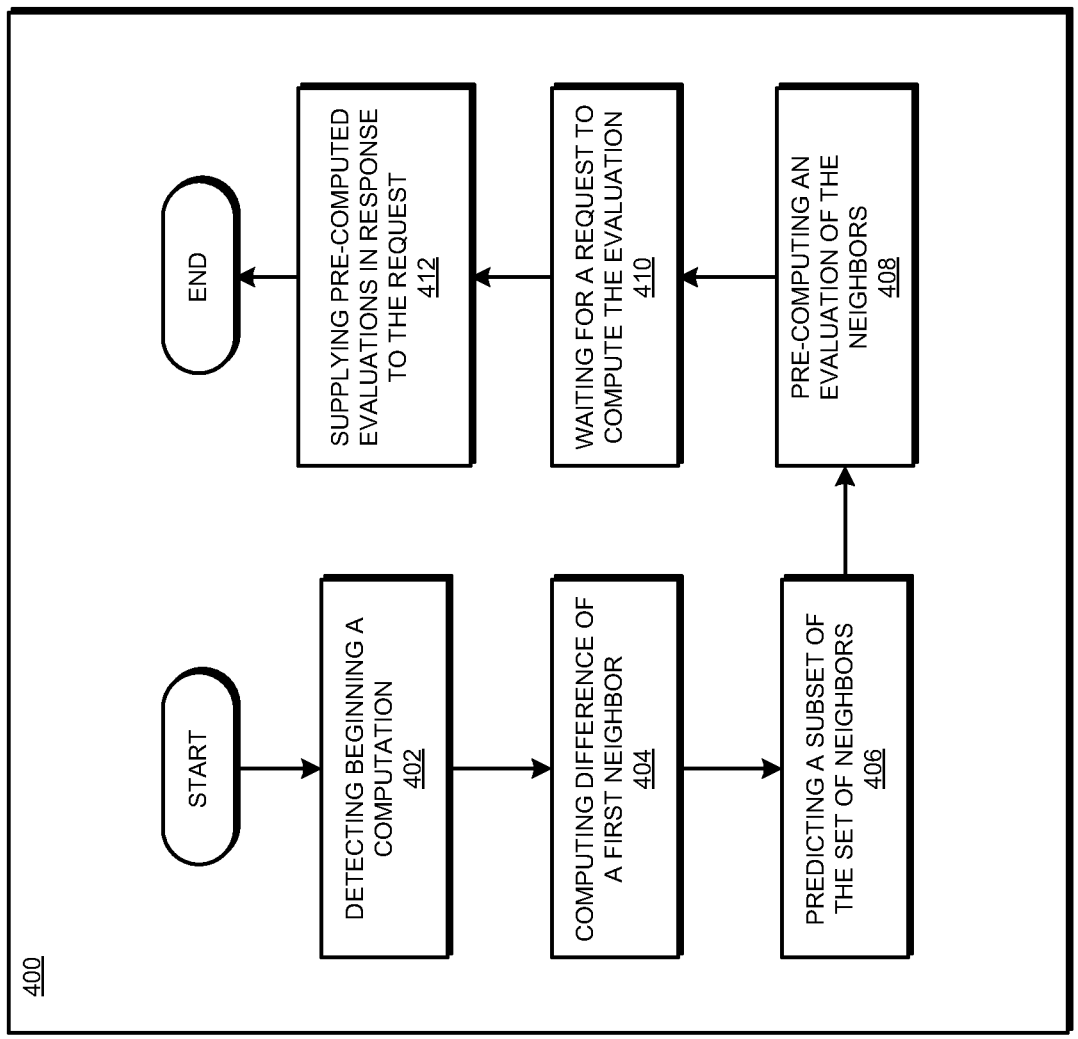
FIG. 4 depicts a flowchart of an example method for parallelization of numeric optimizers in accordance with an illustrative embodiment.

With reference to FIG. 4, this figure depicts a flowchart of an example method 400 for parallelization of numeric optimizers in accordance with an illustrated embodiment. In block 402, application 302 detects initialization of a computation. For example, application 302 can detect initialization of a computation to numerically optimize a function with an input vector. In block 404, application 302 computes a difference (vector-distance) between an input vector and a first neighbor vector of a set of neighbor vectors. In block 406, application 302 predicts a subset of the set of neighbor vectors. For example, application 302 can predict the subset by adding the computed difference to the input vector to only one parameter value of the input vector at a time.

In block 408, application 302 pre-computes a set of evaluation values of the first neighbor vector and the subset of the set of neighbor vectors. For example, application 302 can pre-compute evaluation values for the first neighbor vector and the subset of the set of neighbor vectors by inputting the neighbor vectors into the function being numerically optimized to generate associated evaluation values for each inputted neighbor vector. In block 410, application 302 detects a request to compute at least one of the set of evaluation values from a numeric optimizer. In block 412, application 302 supplies the pre-computed set of evaluation values to the numeric optimizer in response to the request. In an embodiment, the numeric optimizer does not perform a computation to compute the set of evaluation values. Method 400 then ends.

Various embodiments of the present invention are described herein with reference to the related drawings. Alternative embodiments can be devised without departing from the scope of this invention. For example, additional variational algorithms for quantum computing may be included in method 400 without departing from the scope of the present invention.

Thus, a computer implemented method, system or apparatus, and computer program product are provided in the illustrative embodiments for parallelization of numeric optimizers. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   detecting an initialization of a numeric optimization process of a given function;
   computing a vector-distance between an input vector and a first neighbor vector of a set of neighbor vectors;
   predicting, using the computed vector-distance, a subset of the set of neighbor vectors;
   pre-computing, in a parallel processing system, a set of evaluation values in parallel, each evaluation value corresponding to one of the subset of the set of neighbor vectors; and
   supplying, without performing a computation of a computation request, a parallelly pre-computed evaluation value from the set of evaluation values to the numeric optimization process.

2. The method of claim 1, detecting the initialization of the numeric optimization process further comprising:
   sensing a trigger through an application programming interface.

3. The method of claim 1, wherein the parallel processing system is a multi-core processor.

4. The method of claim 1, further comprising:
   storing the set of evaluation values and the corresponding subset of the set of neighbor vectors in a database.

5. The method of claim 4, further comprising:
   detecting an initialization of a second computation of the numeric optimization process; and
   removing, in response to detecting an initialization of the second computation, the stored set of evaluation values and the corresponding subset of the set of neighbor vectors from the database.

6. The method of claim 1, pre-computing the set of evaluation values further comprising:
   inputting the set of neighbor vectors into the given function to generate the set of evaluation values.

7. A computer usable program product comprising a computer-readable storage device, and program instructions stored on the storage device, the stored program instructions comprising:
   program instructions to detect an initialization of a numeric optimization process of a given function;
   program instructions to compute a vector-distance between an input vector and a first neighbor vector of a set of neighbor vectors;
   program instructions to predict, using the computed vector-distance, a subset of the set of neighbor vectors;
   program instructions to pre-compute, in a parallel processing system, a set of evaluation values in parallel, each evaluation value corresponding to one of the subset of the set of neighbor vectors; and
   program instructions to supply, without performing a computation of a computation request, a parallelly pre-computed evaluation value from the set of evaluation values to the numeric optimization process.

8. The computer usable program product of claim 7, wherein the computer usable code is stored in a computer readable storage device in a data processing system, and wherein the computer usable code is transferred over a network from a remote data processing system.

9. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

10. The computer usable program product of claim 7, program instructions to detect the initialization of the numeric optimization process further comprising:
    program instructions to sense a trigger through an application programming interface.

11. The computer usable program product of claim 7, wherein the parallel processing system is a multi-core processor.

12. The computer usable program product of claim 7, the stored program instructions further comprising:
    program instructions to store the set of evaluation values and the corresponding subset of the set of neighbor vectors in a database.

13. The computer usable program product of claim 12, the stored program instructions further comprising:
    program instructions to detect an initialization of a second computation of the numeric optimization process; and
    program instructions to remove, in response to detecting an initialization of the second computation, the stored set of evaluation values and the corresponding subset of the set of neighbor vectors from the database.

14. The computer usable program product of claim 7, program instructions to pre-compute the set of evaluation values further comprising:
    program instructions to input the set of neighbor vectors into the given function to generate the set of evaluation values.

15. A computer system comprising a processor, a computer-readable memory, and a computer-readable storage device, and program instructions stored on the storage device for execution by the processor via the memory, the stored program instructions comprising:
    program instructions to detect an initialization of a numeric optimization process of a given function;
    program instructions to compute a vector-distance between an input vector and a first neighbor vector of a set of neighbor vectors;
    program instructions to predict, using the computed vector-distance, a subset of the set of neighbor vectors;
    program instructions to pre-compute, in a parallel processing system, a set of evaluation values in parallel, each evaluation value corresponding to one of the subset of the set of neighbor vectors; and
    program instructions to supply, without performing a computation of a computation request, a parallelly pre-computed evaluation value from the set of evaluation values to the numeric optimization process.

16. The computer system of claim 15, program instructions to detect the initialization of the numeric optimization process further comprising:
    program instructions to sense a trigger through an application programming interface.

17. The computer system of claim 15, the stored program instructions further comprising:
    program instructions to store the set of evaluation values and the corresponding subset of the set of neighbor vectors in a database.

18. The computer system of claim 17, the stored program instructions further comprising:
    program instructions to detect an initialization of a second computation of the numeric optimization process; and
    program instructions to remove, in response to detecting an initialization of the second computation, the stored set of evaluation values and the corresponding subset of the set of neighbor vectors from the database.

19. The computer system of claim 15, program instructions to pre-compute the set of evaluation values further comprising:
    program instructions to input the set of neighbor vectors into the given function to generate the set of evaluation values.

20. The computer system of claim 15, wherein the parallel processing system is a multi-core processor.

* * * * *